R. W. UHLIG.
TYPE WRITING MACHINE.
APPLICATION FILED AUG. 4, 1909.
965,421.
Patented July 26, 1910.
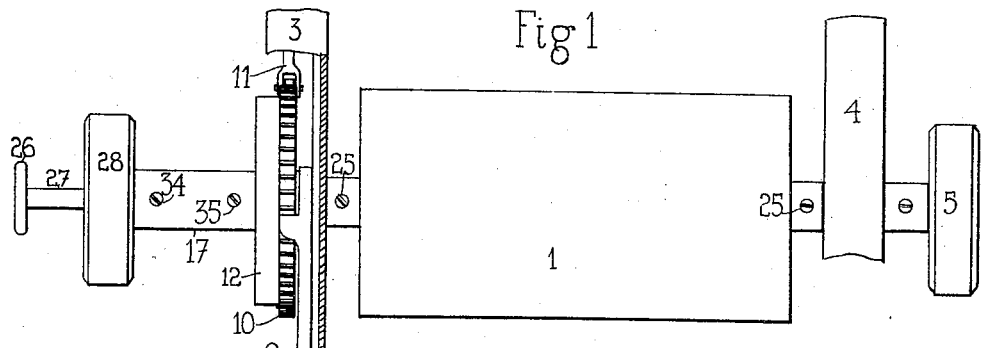
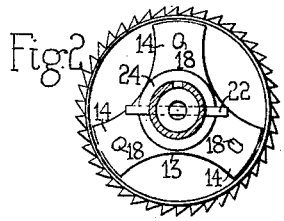
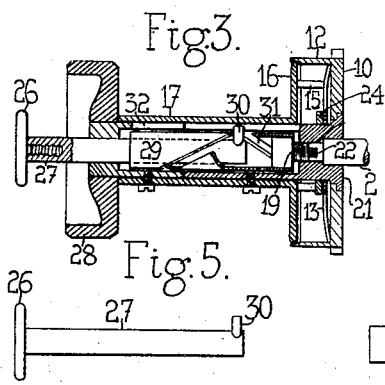
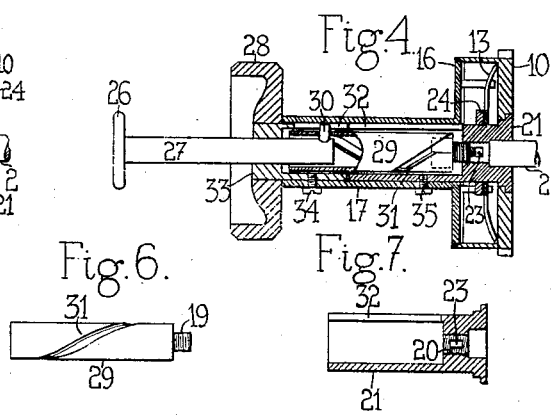
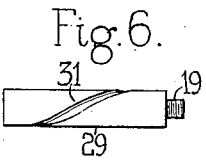
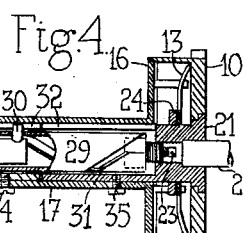
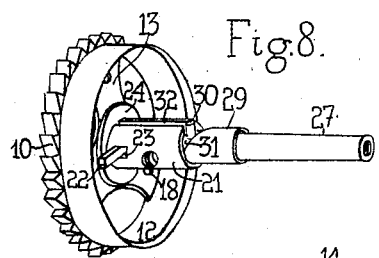
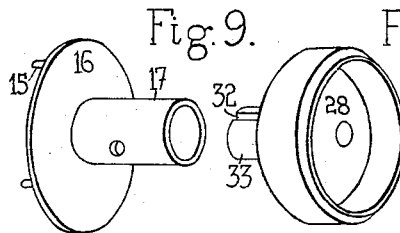
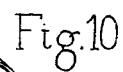
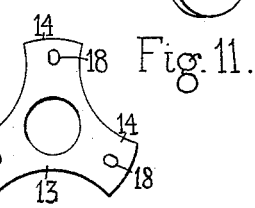
WITNESSES:
John O. Seifert
Sigmund Schiff
INVENTOR:
Richard W. Uhlig,
By B. C. Stickney,
ATTORNEY.

UNITED STATES PATENT OFFICE.

RICHARD W. UHLIG, OF RUTHERFORD, NEW JERSEY, ASSIGNOR TO UNDERWOOD TYPEWRITER COMPANY, OF NEW YORK, N. Y., A CORPORATION OF NEW JERSEY.

TYPE-WRITING MACHINE.

965,421. Specification of Letters Patent. Patented July 26, 1910.

Application filed August 4, 1909. Serial No. 511,088.

*To all whom it may concern:*

Be it known that I, RICHARD W. UHLIG, a citizen of the United States, residing in Rutherford, in the county of Bergen and State of New Jersey, have invented certain new and useful Improvements in Type-Writing Machines, of which the following is a specification.

This invention relates to devices for releasably clutching the line-space wheel to the platen of a typewriting machine.

In certain of its features the invention is an improvement upon the devices disclosed in application No. 508,902, filed July 22, 1909; although certain features herein set forth are applicable to other forms of devices for connecting the platen to the line-space wheel. In said application the main clutch member consisted of a dished spring plate having three radial arms, the plate connected to the platen and constructed to be buckled to cause said arms to spread out or lengthen, to bite an annular flange which was provided on the line-space wheel, thereby locking the latter to the platen. The buckling of the clutch plate was effected by a lever mounted upon the platen axle and operated by a finger-piece, which was mounted on the end of said axle outside of the finger wheel which usually turns the platen.

According to the present invention the buckling of the clutch plate is effected by a finger-piece mounted outside of the usual platen-rotating finger wheel and movable in a direction longitudinal of the platen axis. This movement of the finger-piece is cause to rotate a screw, and the latter effectually forces the buckling plate to expand radially to act as a clutch. Said button is mounted on the end of a stem, and the latter works in a tubular part which is formed or provided on said screw. A helical cam slot is formed in said tubular part, and said stem has a key or bit which works in said slot. The reciprocating movement of the stem and button is thus converted into a rotary movement of the screw, for either clutching or unclutching the line-space wheel and platen.

In the accompanying drawings, Figure 1 is a diagrammatic plan of a portion of the platen carriage of the Underwood front strike writing machine embodying the present improvements. Fig. 2 is a sectional elevation showing the clutching devices. Figs. 3 and 4 are longitudinal sectional views showing the line-space wheel clutched to and unclutched from the platen axle. Fig. 5 is a view of the stem and button which operates the clutching devices. Fig. 6 is a clutch-operating screw with its tubular extension and cam slot. Fig. 7 is a tubular boss, which is fixed upon the platen axle, the latter shown in dotted lines. Fig. 8 is a perspective view of the clutching devices. Fig. 9 is a perspective view of a head which is fixed upon the boss seen at Fig. 7. Fig. 10 is a perspective view of the platen rotating finger wheel, whose hub is inserted within the hub seen at Fig. 9. Fig. 11 is a view of the buckling plate.

The usual cylindrical platen 1 is fixed upon an axle 2, which is journaled in a platen frame whose ends are seen at 3, 4; a finger wheel 5 being secured upon one end of the axle which projects from the platen frame, for rotating the platen. The line-space movements of the platen are effected by a lever 7, slide 8, pawl 9 and line-space wheel 10, the latter loosely mounted upon the platen axle 2, and held against turning by means of a spring check or detent 11. Upon the line-space wheel is formed an annular projecting flange or rim 12, forming the periphery of a drum; and within this drum is confined a buckling plate 13, dished or bowed, as seen at Figs. 3, 4, and preferably comprising three equidistant arms 14, radiating from the platen axle 2. When relaxed, as at Fig. 4, the bowed arms 14 do not bind upon the flange 12; but they may be pressed against the line-space wheel 10 and buckled or straightened sufficiently to cause them to spread and bite effectually the inner periphery of said flange 12, whereby the clutch member 13 is locked to the line-space wheel. The clutch is connected to turn with the platen axle by means of pins 15, projecting parallel with the axle 2 from a disk or head 16, having a hub 17 whereby it is secured upon the platen axle; said head forming the closing member of the drum 10, 12. The pins 15 pass through radial slots 18 in the clutch member, and permit free buckling and unbuckling movement thereof, while preventing the clutch member from turning relatively to the platen axle. Pressure applied to the middle portion of the clutching plate clamps it against the line-space wheel and causes it to expand in diameter, so that each of the tips of the arms 14 presses radially forcibly against the flange 12.

The clutch is operated by means of a screw 19 threaded at 20 (Fig. 7) into a boss 21 fixed upon the end of the platen axle. Said screw bears against a lever or cross pin 22, which extends transversely through a diametrical perforation 23 formed in the boss. The screw presses said lever toward the platen axle, and the ends of the lever bear upon a washer 24, which is provided for the buckling plate 13. It will be observed that although the screw is threaded into the boss, still the lever 22 is effective in transmitting the pressure of the screw to buckle the plate, which is outside of the boss. The lever divides the pressure of the screw evenly between the sides of the washer, and the latter is sufficiently rigid to impart even pressure all around its circumference to the buckling plate. When the screw is turned from the position at Fig. 4 to that at Fig. 3, the lever 22 is forced to the right and the washer 24 is pressed in the same direction, together with the middle portion of the buckling plate; and since the bowed ends of the latter rest against the face of the line space wheel, they are caused to spread out or expand and forcibly to engage the inner surface of the flange or ring 12, thereby locking the line-space wheel to the platen axle 2, which is fixed to the platen by screws 25, Fig. 1. The screw is caused to rotate to and fro by means of a button 26, which is mounted upon a stem 27 for movement in a direction longitudinal of the platen axle, or in a direction of the length of the stem, the latter extending through a finger wheel 28 which is provided at the left hand end of the carriage for rotating the platen in the usual manner. Said stem 27 works in a tubular extension 29 formed or provided on the screw 19 (Fig. 6) and has a bit or key 30 to engage a helical groove 31 formed in said tubular portion 29, whereby to and fro movement of the stem causes the rotation of the tube 29, and hence of the screw 19. The rotation of the stem 27 during this longitudinal movement is prevented by reason of the bit 30 extending into a groove 32, one portion of which is formed in the boss 21, and the other portion of which is formed in the hub 33 of the finger wheel 28. This groove extends parallel with the platen axis. It will be seen that the hub 33 of the finger wheel fits in the long hub 17 of the head 16, and is secured thereto by a screw 34; and that said hub 17 is secured by a screw 35 to the boss 21. The latter is hollowed out to receive the tubular portion 29 of the screw 19. When the button 26 is pulled to the left, the bit 30 acts upon the helical cam 31, to rotate the tube 29 and the screw 19 in a direction to loosen the latter; and when the button 26 is pressed to the right, it revolves the screw in the opposite direction. A very light pressure on the button 26 is sufficient to operate the clutch, since the movement of the button is very much greater than that of the clutch; and in most cases no spring or detent will need to be employed for the purpose of holding the button 26 in either Fig. 3 or Fig. 4 position. The screw clamps the clutch effectively in working position, without liability of the parts working loose during the operation of the machine; and when the button is pulled out to the position at Fig. 4 both hands are left free for manipulation of the paper.

Variations may be resorted to within the scope of the invention, and portions of the improvements may be used without others, as for instance the button, stem and helical cam may be employed with other varieties of clutching devices; or the screw 19 may be otherwise operated.

Having thus described my invention, I claim:

1. The combination with a platen element and a loose line-space wheel element, of a buckling plate connected to one of said elements, and a screw to press said buckling plate to expand it and thereby lock the line-space wheel to the platen.

2. The combination with a platen element and a loose line-space wheel element, of a buckling plate connected to one of said elements, a screw to press said buckling plate to expand it and thereby lock the line-space wheel to the platen, and a finger-piece operatively connected to said screw.

3. The combination with a platen having an axle and a loose line-space wheel provided with a shoulder or flange, of a buckling plate connected to the axle, a screw threaded into a part upon the platen axle and having means to compress said buckling plate to cause it to expand and its edges to bite said flange or shoulder, and a finger-piece to operate said screw.

4. The combination with a platen having an axle and a loose line-space wheel provided with a flange or shoulder, of a boss fixed upon the platen axle, a lever extending diametrically through a perforation in said boss, a screw threaded into said boss to bear against said lever, means to operate said screw, and a buckling plate pressed by the ends of the lever and caused thereby to expand so that its periphery or edge bites said flange or shoulder.

5. The combination with a platen having an axle and a loose line-space wheel provided with a flange or shoulder, of a boss fixed upon the platen axle, a lever extending diametrically through a perforation in said boss, a screw threaded into said boss to bear against said lever, means to operate said screw, and a buckling plate pressed by the ends of the lever and caused thereby to expand so that its periphery or edge bites said flange or shoulder; a washer being interposed between said lever and said buckling plate.

6. The combination with a platen having an axle and a loose line-space wheel provided with a flange or ring forming a drum, of a boss fixed upon the end of the platen axle, a screw threaded into the end of said boss, a buckling plate pressed by said screw against said line-space wheel and caused thereby to expand and bite said ring or flange, a plate or head fixed upon said boss and having means connecting it to said buckling plate, a finger piece, and a stem device extending from said finger piece through said boss to operate said screw.

7. The combination with a platen having an axle and a loose line-space wheel provided with a flange or ring forming a drum, of a boss fixed upon the end of the platen axle, a lever extending diametrically through a perforation in said boss, a screw threaded into the end of said boss to bear against said lever, a buckling plate pressed by the ends of the lever against said line-space wheel and caused thereby to expand to bite said ring or flange, a plate or head fixed upon said boss to close said drum and having means connecting it to said buckling plate, and a finger piece having a stem extending through said boss and connected to said screw to operate the same.

8. The combination with a revoluble platen and a loose line-spaced wheel, of a platen axle, a finger wheel connected to the platen axle for rotating the platen, a button outside of said finger wheel, a rotary device mounted upon the platen axle and forming part of a mechanism to clutch the line-space wheel to the platen, and a connection extending from said button through said finger wheel to said rotary device, and including means to enable a movement of the button in a direction longitudinal of the platen axle to turn said rotary device.

9. The combination with a revoluble platen and a loose line-space wheel, of a finger wheel connected to the platen for rotating the same, a stem extending through said finger wheel and movable endwise and carrying on its outer end a button, a device rotatable relatively to the platen and forming part of a mechanism to clutch the line-space wheel to the platen, and means for enabling a longitudinal movement of said stem to turn said rotary device.

10. The combination with a revoluble platen and a loose line-space wheel, of a finger wheel connected to the platen for rotating the same, a stem extending through said finger wheel and movable endwise and carrying on its outer end a button, a device rotatable relatively to the platen and forming part of a mechanism to clutch the line-space wheel to the platen, and means for enabling a longitudinal movement of said stem to turn said rotary device; said rotary device including a tubular portion having a helical cam, said stem extending within said tubular portion and having a bit to engage said cam; said bit extending into a groove provided upon a part which is fixed to the platen and serving to prevent rotation of the stem.

11. The combination with a revoluble platen and a loose line-space wheel, of a finger wheel connected to the platen for rotating the same, a stem element extending through said finger wheel and movable endwise and carrying on its outer end a button, an element rotatable relatively to the platen and forming part of a mechanism to clutch the line-space wheel to the platen, means for enabling a longitudinal movement of said stem element to turn said rotatable element; one of said stem and rotatable elements having a helical cam, and the other having a bit to engage said cam, and means to hold said stem element against rotation during its endwise movement.

12. The combination with a revoluble platen and a loose line-space wheel, of a stem carrying on its outer end a button and movable endwise in a direction longitudinal of the platen axis, a device rotatable relatively to the platen and forming part of a mechanism to clutch the line-space wheel to the platen, and means for enabling a longitudinal movement of said stem to turn said rotatable device.

13. The combination with a revoluble platen and a loose line-space wheel, of a stem carrying on its outer end a button and movable endwise in a direction longitudinal of the platen axis, a device rotatable relatively to the platen and forming part of a mechanism to clutch the line-space wheel to the platen, means for enabling a longitudinal movement of said stem to turn said rotatable device, said stem being mounted to slide within the rotatable element, and the latter having a helical cam engaged by a bit provided upon the stem, and means to support said stem against rotation when moved endwise.

14. The combination with a revoluble platen and a loose line-space wheel, of a stem carrying on its outer end a button and movable endwise in a direction longitudinal of the platen axis, a device rotatable relatively to the platen and forming part of a mechanism to clutch the line-space wheel to the platen, means for enabling a longitudinal movement of said stem to turn said rotatable device, a finger wheel through which said stem extends, and means connecting the finger wheel to the platen to rotate the same.

15. The combination with a revoluble platen and a loose line-space wheel, of a stem element carrying on its outer end a button and movable endwise in a direction longitudinal of the platen axis, an element rotatable relatively to the platen and forming part of a mechanism to clutch the line-space wheel to the platen, and means for enabling a longitudinal movement of said stem to turn said rotary device; one of said stem and rotatable elements being mounted to slide endwise within the other, and one having a helical cam engaged by a bit provided upon the other of said elements.

16. The combination with a revoluble platen and a loose line-space wheel, of a stem carrying a button and mounted for longitudinal movement endwise of the platen, a screw, means connecting said stem to said screw in a manner to enable the endwise movement of the stem to rotate the screw, and a clutching member operated by said screw to be forced thereby to lock the line-space wheel to the platen.

17. The combination with a revoluble platen and a loose line-space wheel, of a stem carrying a button and mounted for longitudinal movement endwise of the platen, a screw, means connecting said stem to said screw in a manner to enable the endwise movement of the stem to rotate the screw, a clutching member operated by said screw to be forced thereby to lock the line-space wheel to the platen, said screw having a tubular extension provided with a helical cam-slot, and said stem working in said tubular extension and having a bit projecting through said cam-slot, and means to support said stem against rotation; said bit projecting into a groove provided in a part secured to the platen to support the stem against rotation.

18. The combination with a revoluble platen and a loose line-space wheel, of a stem element carrying a button and mounted for longitudinal movement endwise of the platen, a screw element, means connecting said stem to said screw in a manner to enable the endwise movement of the stem to rotate the screw, and a clutching member operated by said screw to be forced thereby to lock the line-space wheel to the platen; one of said stem and screw elements having a hollow portion to inclose the other of said elements, and one thereof having a helical cam and the other thereof having a bit to engage said cam.

19. The combination with a revoluble platen and a loose line-space wheel, of a stem element carrying a button and mounted for longitudinal movement endwise of the platen, a screw element, means connecting said stem to said screw in a manner to enable the endwise movement of the stem to rotate the screw, a clutching member operated by said screw to be forced thereby to lock the line-space wheel to the platen; one of said stem and screw elements having a hollow portion to inclose the other of said elements, and one thereof having a helical cam and the other thereof having a bit to engage said cam, and means for guiding the bit, to enable endwise movement of the stem to effect rotation of the screw.

20. The combination with a platen element and a loose line-space wheel element, of a buckling plate connected to one of said elements, a screw to press said buckling plate to expand it and thereby lock the line-space wheel to the platen, a stem carrying a button and mounted for longitudinal movement endwise of the platen, and means connecting said stem to said screw in a manner to enable the endwise movement of the stem to rotate the screw, said screw having a tubular extension provided with a helical cam-slot, and said stem working in said tubular extension and having a bit projecting into said cam-slot.

21. The combination with a platen element and a loose line-space wheel element, of a buckling plate connected to one of said elements, a screw to press said buckling plate to expand it and thereby lock the line-space wheel to the platen, a stem carrying a button and mounted for longitudinal movement endwise of the platen, and means connecting said stem to said screw in a manner to enable the endwise movement of the stem to rotate the screw, said screw having a tubular extension provided with a helical cam-slot, and said stem working in said tubular extension and having a bit projecting into said cam-slot; said bit projecting into a groove provided in a part secured to the platen to support the stem against rotation.

22. The combination with a revoluble platen and a loose line-space wheel, of a stem carrying a button and mounted for longitudinal movement endwise of the platen, a screw, means connecting said stem to said screw in a manner to enable the endwise movement of the stem to rotate the screw, a shoulder or flange on said line-space wheel, and a buckling plate connected to the axle; said screw threaded into a part upon the platen axle and having means to compress said buckling plate to cause it to expand and its edges to bite said flange or shoulder.

23. The combination with a revoluble platen and a loose line-space wheel, of a stem element carrying on its outer end a button and movable endwise in a direction longitudinal of the platen axis, an element rotatable relatively to the platen, means for enabling a longitudinal movement of said stem to turn said rotatable element; one of said stem and rotatable elements being mounted to slide endwise within the other, and one having an angular cam engaged by a bit provided upon the other of said elements; and a member compressed by said rotary element and made to expand radially and lock the line-space wheel to the platen.

24. The combination with a revoluble platen and a loose line-space wheel, of a stem carrying on its outer end a button and movable endwise in a direction longitudinal of the platen axis, a device rotatable relatively to the platen, means for enabling a longitudinal movement of said stem to turn said rotatable device, a finger wheel through which said stem extends, means connecting the finger wheer to the platen to rotate the same, and a buckling plate compressed by said rotatable device and made to expand radially to lock the line-space wheel to the platen.

25. The combination with a revoluble platen element and a loose line-space wheel element, one of said elements having a flange or shoulder, of a stem carrying on its outer end a button and movable endwise in a direction longitudinal of the platen axis, a device rotatable relatively to the platen, means for enabling a longitudinal movement of said stem to turn said rotatable device, and a clutching member expanded by said rotatable device against said flange or shoulder.

26. The combination with a revoluble platen and a loose line-space wheel, of a stem carrying on its outer end a button and movable endwise in a direction longitudinal of the platen axis, an element rotatable relatively to the platen, means for enabling a longitudinal movement of said stem to turn said rotative device, one of said stem and rotatable elements being mounted to slide within the other, and one of said elements having a helical cam engaged by a bit provided upon the other, means to support one of said elements against rotation when moved endwise, and an expanding clutch operated by said rotatable element to connect the line-space wheel to the platen.

27. The combination of a revoluble platen, a platen axle, a loose line-space wheel, a flange or shoulder, a finger wheel connected to the platen for rotating the same, a stem element extending through said finger wheel and movable endwise and carrying on its outer end a button, an element rotatable relatively to the platen, means for enabling a longitudinal movement of said stem element to turn said rotatable element; one of said stem and rotatable elements having a helical cam, and the other having a bit to engage said cam, means to hold said stem element against rotation during such longitudinal movement, a lever engaged by said rotatable element, and a buckling plate pressed by the ends of the lever and caused thereby to expand so that its periphery or edge bites said flange or shoulder, to lock the line-space wheel to the platen.

28. The combination with a revoluble platen and a loose line-space wheel, of a platen axle, a finger wheel connected to the platen axle for rotating the platen, a button outside of said finger wheel, a rotary device mounted upon the platen axle, a connection extending from said button through said finger wheel to said rotary device, and including means to enable a movement of the button in a direction longitudinal of the platen axle to turn said rotary device, and a clutching member compressed by said rotary device and caused to expand radially against a flange or shoulder to lock the line-space wheel to the platen.

29. The combination with a platen having an axle and a loose line-space wheel provided with a flange or ring forming a drum, of a boss fixed upon the end of the platen axle, a screw element threaded into the end of said boss, a buckling plate pressed by said screw against said line-space wheel and caused thereby to expand and bite said ring or flange, a plate or head fixed upon said boss and having means connecting it to said buckling plate, a stem element carrying a button and mounted for longitudinal movement endwise of the platen, and means connecting said stem to said screw in a manner to enable the endwise movement of the stem to rotate the screw; one of said stem and screw elements having a hollow portion to inclose the other of said elements, and one thereof having a helical cam and the other thereof having a bit to engage said cam.

30. The combination with a revoluble platen, a platen axle and a loose line-space wheel, of a stem extending through a finger wheel and carrying on its outer end a button and mounted for longitudinal movement endwise of the platen, a boss secured upon said platen axle, a disk or head upon said boss, a device connected to said head to clutch the line-space wheel, a screw threaded into said boss to operate said clutching device, and having a tubular extension within said boss provided with a helical cam slot; said stem working in said tubular extension and having a bit projecting through said cam slot; and a hub on said finger wheel; said hub fitting within a hub provided on said head, both said finger wheel hub and said boss being fixed to the hub of said head, and a groove being provided in said boss to receive said bit to prevent rotation of said stem during its endwise movement.

RICHARD W. UHLIG.

Witnesses:
JOHN O. SEIFERT,
K. FRANKFORT.